United States Patent
Toll et al.

(10) Patent No.: US 7,941,651 B1
(45) Date of Patent: May 10, 2011

(54) METHOD AND APPARATUS FOR COMBINING MICRO-OPERATIONS TO PROCESS IMMEDIATE DATA

(75) Inventors: Bret L. Toll, Hillsboro, OR (US); John Alan Miller, Portland, OR (US); Michael A. Fetterman, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1219 days.

(21) Appl. No.: 10/185,876

(22) Filed: Jun. 27, 2002

(51) Int. Cl.
G06F 9/34 (2006.01)

(52) U.S. Cl. ........................................................ 712/225

(58) Field of Classification Search .................. 712/210, 712/208, 203, 213
See application file for complete search history.

(56) References Cited

U.S. PATENT DOCUMENTS

| | | | |
|---|---|---|---|
| 4,896,258 A * | 1/1990 | Yamaguchi et al. | 712/236 |
| 4,972,315 A * | 11/1990 | Yamasaki et al. | 712/201 |
| 5,751,942 A | 5/1998 | Christensen et al. | |
| 5,752,015 A * | 5/1998 | Henry et al. | 712/241 |
| 5,867,681 A * | 2/1999 | Worrell et al. | 712/208 |
| 6,014,742 A | 1/2000 | Krick et al. | |
| 6,018,786 A | 1/2000 | Krick et al. | |
| 6,073,213 A | 6/2000 | Peled et al. | |
| 6,076,144 A | 6/2000 | Peled et al. | |
| 6,170,038 B1 | 1/2001 | Krick et al. | |
| 6,182,210 B1 | 1/2001 | Akkary et al. | |
| 6,216,206 B1 | 4/2001 | Peled et al. | |
| 6,219,779 B1 * | 4/2001 | Takayama et al. | 712/210 |
| 6,240,509 B1 | 5/2001 | Akkary | |
| 6,338,132 B1 * | 1/2002 | Kyker et al. | 712/211 |
| 6,732,257 B1 * | 5/2004 | Sheaffer | 712/210 |
| 6,826,676 B2 * | 11/2004 | Wishneusky | 712/210 |

OTHER PUBLICATIONS

Intel Architecture Software Developer's Manual vol. 2: Instruction Set Reference, Intel Corporation, 1997, pp. 3-1 to 3-4, 3-70 to 3-76, and 3-286 to 3-290.*
Intel Architecture Software Developer's Manual, vol. 2: Instruction Set Reference. 1997, pp. 2-1 through 2-2.*
Shaaban, EECC250 Lecture #19. Feb. 3, 2000. pp. 1-26.*
Hyde, Randall. "Art of Assembly". pp. 1-10. Sep. 27, 1996.*
Patterson, David. Hennessy, John. "Computer Architecture: A Quantitative Approach". Morgan Kaufmann Publishers, Inc, Second Edition. pp. 127-131. 1996.*
X86-64™ Technology White Paper AMD, "Advanced Micro Devices, Inc. x86-64™ Technology White Paper", Advanced Micro Devices, Inc., One AMD Place, Sunnyvale, CA 94088, pp. 1-13.
Preliminary Information, "AMD 64-Bit Technology, The AMD x86-64™ Architecture Programmers Overview", AMD, Publication #24108 Rev:C, Issue Date Jan. 2001, 134 pages.

* cited by examiner

*Primary Examiner* — Robert Fennema
(74) *Attorney, Agent, or Firm* — Trop, Pruner & Hu, P.C.

(57) ABSTRACT

A method and apparatus for combining micro-operations to process immediate data. The immediate data may be wider than the immediate data storage capacity of a micro-operation. A first micro-operation is issued to process a first portion of the immediate data, which can be processed within the immediate data storage capacity of a micro-operation. A second micro-operation is issued to process a second portion of the immediate data, which can be processed within the immediate data storage capacity of a micro-operation. Execution of the first and second micro-operations and optionally of a third micro-operation serves to reconstruct the immediate data comprising the first portion and the second portion of the immediate data.

16 Claims, 15 Drawing Sheets

METHOD AND APPARATUS FOR COMBINING MICRO-OPERATIONS TO PROCESS IMMEDIATE DATA

FIELD OF THE DISCLOSURE

This disclosure relates generally to the field of processors. In particular, the disclosure relates to processing immediate data in a processor through combined multiple micro-operations.

BACKGROUND OF THE DISCLOSURE

A typical microprocessor used in modern computers may be capable of executing a few hundred different instructions having various operand sizes, possibly including 8-bit, 16-bit, 32-bit, 64-bit, 80-bit, or 128-bit operand sizes. These instructions may be decoded and translated into micro-operations for execution by the microprocessor. At any one time a modern microprocessor may store thousands of micro-operations for execution.

Instructions address operands in a number of ways. An operand may reside in a register or in memory or may be specified in the instruction itself as immediate data. Similarly the address of an operand in memory may reside in one or more registers or may be specified in the instruction itself as immediate data or specified by some combination of these alternatives. Instruction lengths may be fixed or variable, but storage allocated inside a microprocessor for storing micro-operations is typically of a fixed length. Micro-operation storage typically includes fields for specifying operand registers, portions of operand addresses and immediate operand data.

An instruction that includes a long immediate operand (64 or more bits of data for example) may require substantially more micro-operation storage than an instruction that has only register operands or includes only one or two bytes of immediate data. On the average, relatively few of the micro-operations stored by the microprocessor require a very large field for storing immediate operand data. If sufficient micro-operation storage is allocated to accommodate an instruction that includes a long immediate operand, then substantial storage space is potentially wasted, on average, for thousands of micro-operations stored by the microprocessor.

One technique for compressing immediate operand data is described in application Ser. No. 09/223,299, titled "System and Method for Storing Immediate Data," filed Dec. 30, 1998, and assigned to Intel Corporation of Santa Clara, Calif.; now U.S. Pat. No. 6,338,132. The technique provides for control information that may be specified in a field of a current micro-operation to indicate that immediate data for the current micro-operation should be sign extended, or to indicate that a back scavenging technique is being used to store a portion of the immediate data for the current micro-operation with the previous micro-operation, or to indicate that a forward scavenging technique is being used to store a portion of the immediate data for the current micro-operation with the next micro-operation, or to indicate that the current micro-operation uses the same immediate data stored for the previous micro-operation.

While a majority of the microprocessors used in personal computers may be 32-bit processors, there are applications that may potentially benefit from larger operands and address larger amounts of addressable memory. Instructions used by such applications may use immediate data operands with more than 32-bits, in which case, scavenging storage from more than one adjacent micro-operation may be necessary.

One disadvantage of such an extension to the prior scavenging techniques is added complexity of control circuitry. In addition, the probability of having one adjacent micro-operation from which to scavenge immediate data storage may be substantially greater than the probability of having an adjacent sequence of three or more micro-operations from which to scavenge immediate data storage.

BRIEF DESCRIPTION OF THE DRAWINGS

The present invention is illustrated by way of example and not limitation in the figures of the accompanying drawings.

DETAILED DESCRIPTION

Figure 1:
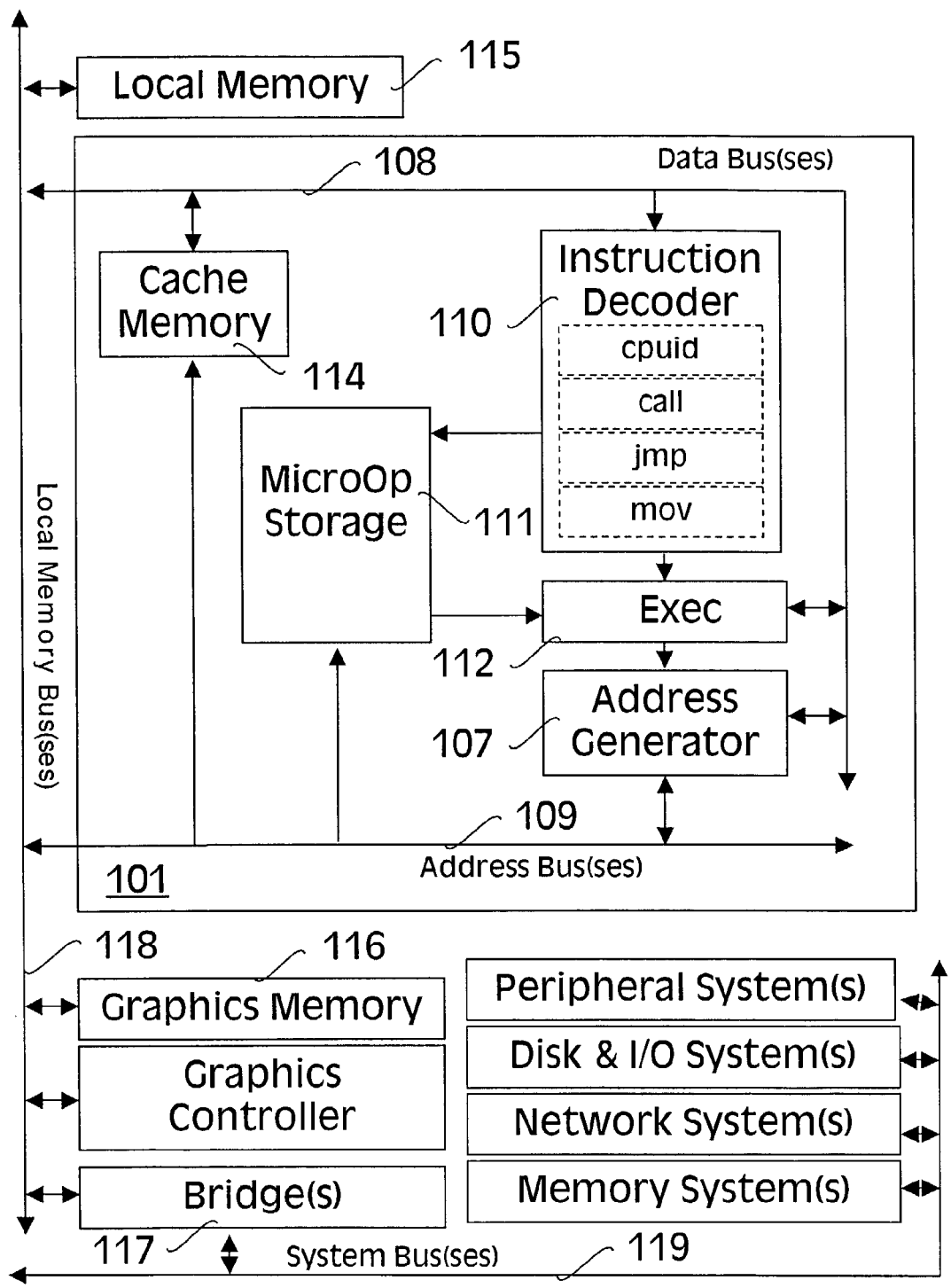
FIG. 1 illustrates one embodiment of a computing system, which uses combined micro-operations to process long immediate data.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims and their equivalents.

Disclosed herein are a method and an apparatus for combining micro-operations to process immediate data. An instruction is received with a long immediate data. The instruction is decoded into a sequence of micro-operations. None of the individual micro-operations has the capacity to hold the long immediate data, but together micro-operations of the sequence may be executed to reconstruct the long immediate data. Thus execution of the instruction is accomplished through the execution of the micro-operations of the sequence.

An apparatus and a storage format for storing micro-operations is also disclosed, which may be used to support processing for instructions with long immediate data. Since many other types of instructions may also be processed, any of these other instruction types requiring less storage or even no storage for immediate data, a savings may be realized in area and circuitry through combining micro-operations to reconstruct a long immediate data when necessary to support processing of such instructions that use them. Additional advantageous consequences of employing the disclosed techniques may include reductions in power utilization and improvements in manufacturing yields.

For the purpose of the following discussion a register may be referred to in order to illustrate an embodiment of the present invention. It will be appreciated that a register may represent an architectural register that is accessible to a programmer, or a working register that is accessible only to micro-operations, or a special purpose latch, or a general purpose storage location in a memory, or any other suitable storage for storing data.

A micro-operation may also be referred to in order to illustrate an embodiment of the present invention. It will be appreciated that a micro-operation may represent a portion of an operation for a particular instruction (in some cases the entire operation), which may be generated responsive to decoding the instruction. Alternatively a micro-operation may represent a portion of an internally generated operation, for example, to manage internal machine state. A micro-operation may be predefined or may be loaded into firmware or software after manufacture. Additionally, a micro-operation storage may be referred to in order to illustrate an embodiment of the present invention. It will further be appreciated that a micro-operation storage may comprise a simple queue or a buffer or a collection of storage locations organized, for example, by a reservation station, or a trace cache to hold micro-operation sequences from recently decoded instructions, or any other storage structure suitable for storing micro-operations.

FIG. 1 illustrates one embodiment of a computing system, which uses combined micro-operations to process long immediate data. The computing system comprises processor 101, local memory bus(ses) 118 and local memory 115. Local memory 115 is addressable by address generator 107 of processor 101 through address bus(ses) 109 and provides access to instructions and data through data bus(ses) 108. Processor 101 includes instruction decoder 110 for converting instructions into micro-operation sequences. Processor 101 also includes micro-operation storage 111 for storing micro-operations of the sequences for execution. Micro-operations may be supplied by instruction decoder 110 or by micro-operation storage 111 to execution logic 112. For one embodiment instruction decoder 110 may receive an instruction with a long immediate data and decode such an instruction into a sequence of micro-operations for reconstructing the long immediate data during execution by execution logic 112. For one embodiment instruction decoder may decode an instruction with a long immediate data of 64-bits into two or more micro-operations for reconstructing the long immediate data from two 32-bit portions and store the two or more micro-operations in micro-operation storage 111, but the invention is not so limited.

Processor 101 may also include cache memory 114, and instruction decoder 110 may decode for execution an instruction set, the instruction set comprising, for example, a CPUID instruction, a CALL instruction, a JMP instruction and a MOV instruction. Such instructions may be fetched from cache memory 114. Alternatively, instructions may be fetched using addresses received via address bus(ses) 109 from cache memory 114 or their corresponding micro-operation sequences may be fetched directly from micro-operation storage 111. The computing system may also include additional components such as graphics memory 116 and/or bridges 117 and system bus(ses) 119 which similarly facilitate storage and transfer of instructions and or data. It will be appreciated that such a computing system may include any number of other additional components such as, for example, a graphics controller, peripheral system(s), disk and I/O system(s), network system(s) and additional memory system(s).

Figure 2:
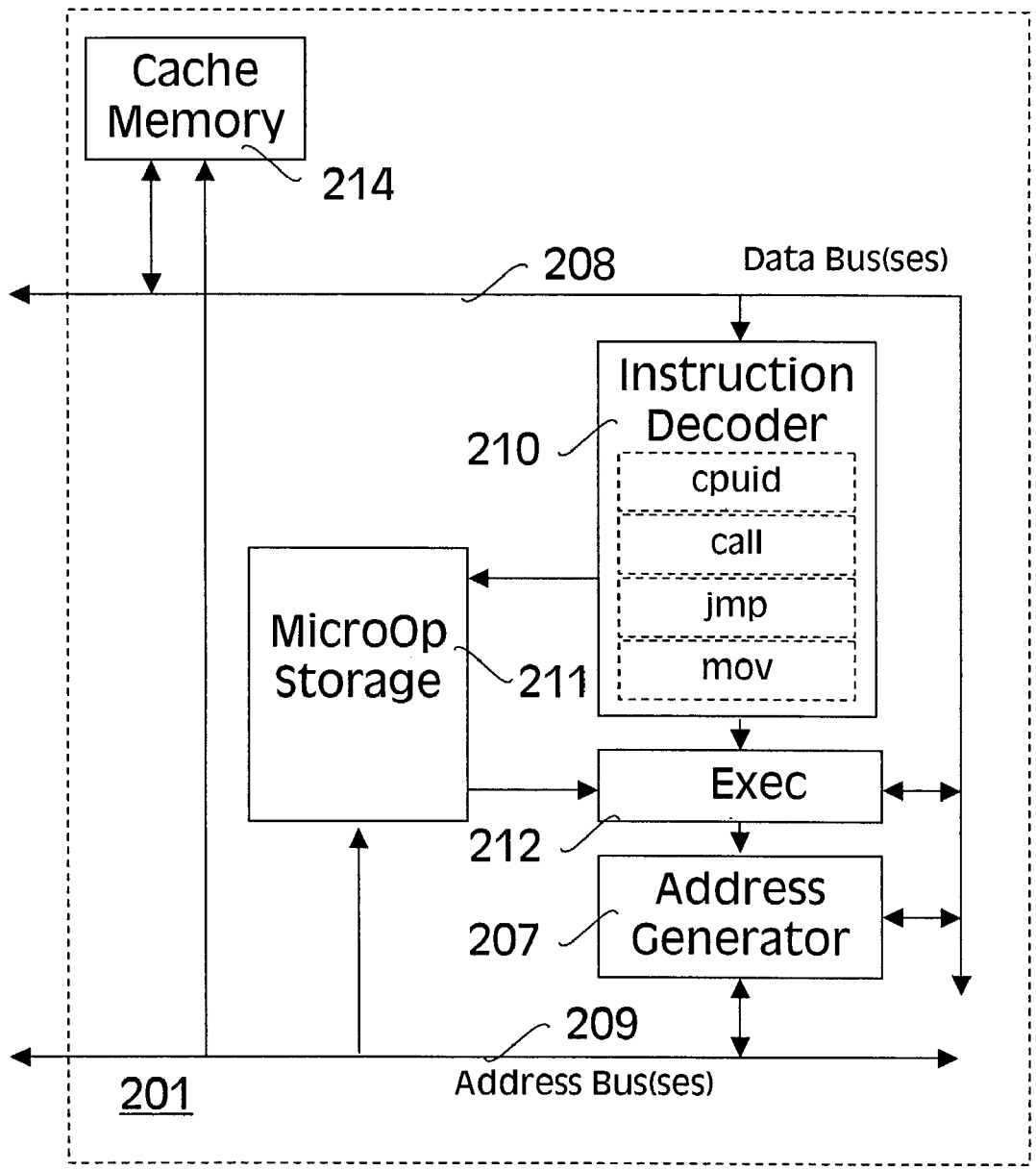
FIG. 2 illustrates one embodiment of a processor, which uses combined micro-operations to process long immediate data.

FIG. 2 illustrates one embodiment of a processor 201, which uses combined micro-operations to process long immediate data. Processor 201 includes data bus(ses) 208 and instruction decoder 210 for converting instructions of an instruction set into micro-operation sequences, the instruction set comprising, for example, a CPUID instruction, a CALL instruction, a JMP instruction and a MOV instruction. For one embodiment instruction decoder 210 may decode, for example, a MOV instruction with a long immediate operand data of 64-bits, or instruction decoder 210 may also decode a MOV instruction with a long immediate memory offset data of 64-bits. Processor 201 also includes micro-operation storage 211 for storing the micro-operations of micro-operation sequences for execution by execution logic 212.

For one embodiment micro-operation storage 211 may store a sequence of micro-operations for an instruction with a long immediate data to reconstruct the long immediate data from two 32-bit portions, but the invention is not so limited. For an alternative embodiment micro-operation storage 211 may store a sequence of micro-operations to reconstruct the long immediate data from four 16-bit portions. For another alternative embodiment micro-operation storage 211 may store a sequence of micro-operations to reconstruct a 128-bit immediate data from two 64-bit portions. For yet another alternative embodiment micro-operation storage 211 may store a sequence of micro-operations to reconstruct a 32-bit immediate data from two 16-bit portions.

Processor 201 may also include cache memory 214, and address generator 207. Instructions may be fetched using addresses received via address bus(ses) 209 from cache memory 214 or corresponding micro-operation sequences may be fetched directly from micro-operation storage 211.

Figure 3A:
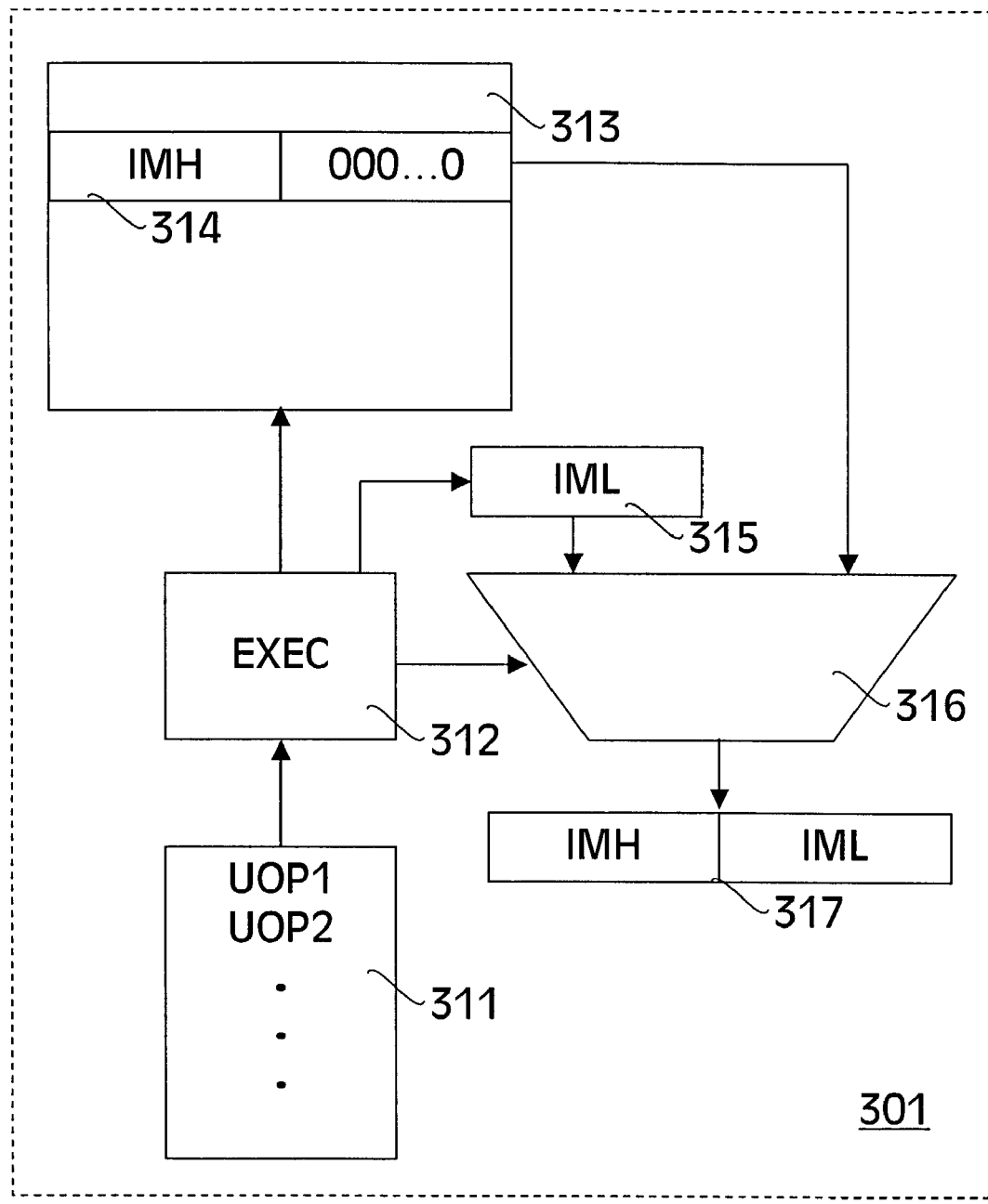
FIG. 3a illustrates one embodiment of an apparatus and micro-operations to reconstruct a long immediate data.

FIG. 3a illustrates one embodiment of an apparatus 301 and micro-operations to reconstruct a long immediate data 317. Apparatus 301 comprises micro-operation storage 311 for providing a first micro-operation, UOP1, to execution logic 312. In accordance with the first micro-operation, execution logic 312 may store a first portion of immediate data, IMH, in a high order field 314 of one of the registers 313. Micro-operation storage 311 also provides a second micro-operation, UOP2, to execution logic 312. In accordance with the second micro-operation, execution logic 312 may provide a second portion of immediate data, IML, to input 315 of logic unit 316 and initiate an operation through logic unit 316 to combine the contents of one of the registers 313 including the first portion of immediate data, IMH, in high order field 314 with the contents of input 315 including the second portion of immediate data, IML, thereby reconstructing long immediate data 317 comprising both the first and the second portions of immediate data.

For one embodiment of apparatus 301, execution unit 316 initiates an addition operation through logic unit 316 in accordance with the second micro-operation. For an alternative embodiment, execution unit 316 initiates a concatenation operation through logic unit 316. For another alternative embodiment, execution unit 316 initiates a logical OR operation through logic unit 316. For one embodiment of apparatus 301, the first portion of immediate data, IMH, is stored as part of the first micro-operation, UOP1, and the second portion of immediate data, IML, is stored as part of the second micro-operation, UOP2, in micro-operation storage 311 but the invention is not so limited. For one embodiment, long immediate data 317 comprises 64-bits of data but the invention is not so limited.

Figure 3B:
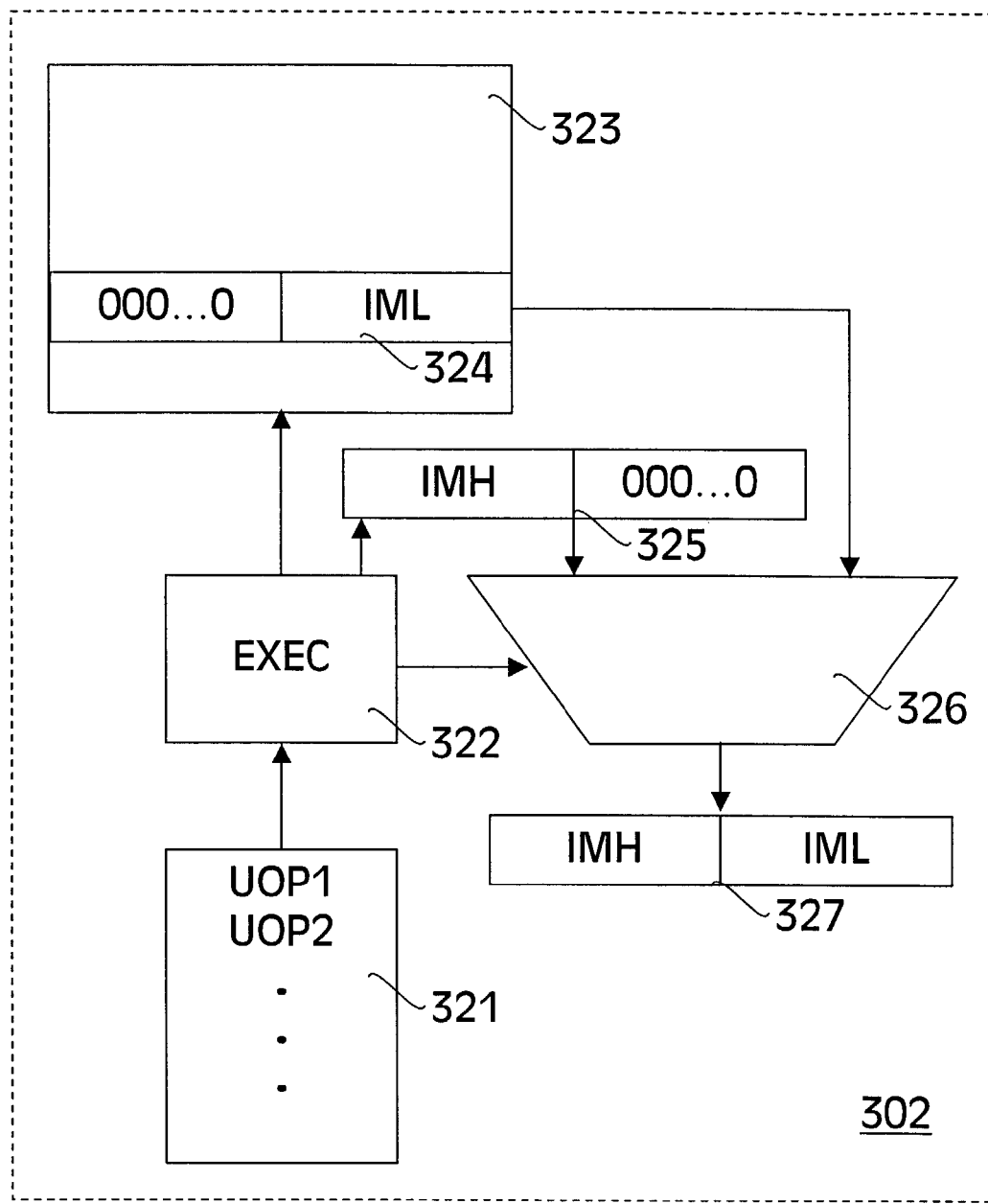
FIG. 3b illustrates an alternative embodiment of an apparatus and micro-operations to reconstruct a long immediate data.

FIG. 3b illustrates an alternative embodiment of an apparatus 302 and micro-operations to reconstruct a long immediate data 327. Apparatus 302 comprises micro-operation storage 321 for providing a first micro-operation, UOP1, to execution logic 322. In accordance with the first micro-operation, execution logic 322 may store a first portion of immediate data, IML, in a low order field 324 of one of the registers 323. Micro-operation storage 321 also provides a second micro-operation, UOP2, to execution logic 322. In accordance with the second micro-operation, execution logic 322 may provide a second portion of immediate data, IMH, to a high order field of input 325 to logic unit 326 and initiate an operation through logic unit 326 to combine the contents of one of the registers 323 including the first portion of immediate data, IML, in low order field 324 with the contents of input 325 including in a high order field the second portion of immediate data, IMH, thereby reconstructing long immediate data 327 comprising both the first and the second portions of immediate data.

It will be appreciated that through combining micro-operations to reconstruct a long immediate data, for example, when use of long immediate data is relatively infrequent, savings realized in area and circuitry for micro-operation storage and execution logic may be significant.

Figure 3C:
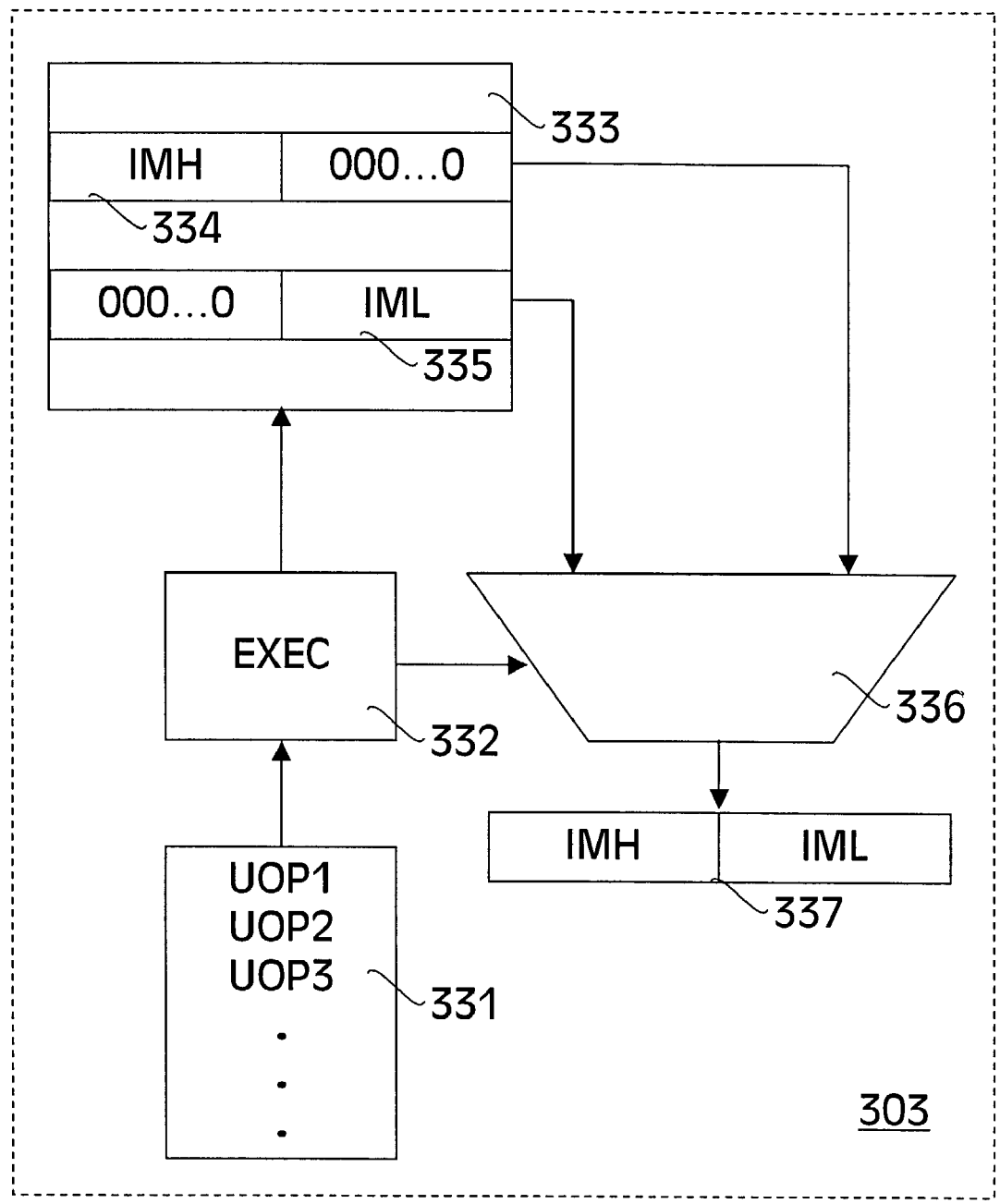
FIG. 3c illustrates another alternative embodiment of an apparatus and micro-operations to reconstruct a long immediate data.

FIG. 3c illustrates another alternative embodiment of an apparatus 303 and micro-operations to reconstruct a long immediate data 337. Apparatus 303 comprises micro-operation storage 331 for providing a first micro-operation, UOP1, to execution logic 332. In accordance with the first micro-operation, execution logic 332 may store a first portion of immediate data, IML, in a low order field 335 of a first one of the registers 333. Micro-operation storage 331 also provides a second micro-operation, UOP2, to execution logic 332. In accordance with the second micro-operation, execution logic 332 may store a second portion of immediate data, IMH, in a high order field 334 of a second one of the registers 333. Micro-operation storage 331 also provides a third micro-operation, UOP3, to execution logic 332. In accordance with the third micro-operation, execution logic 332 may initiate an operation through logic unit 336 to combine the contents of the first one of registers 333 including the first portion of immediate data, IML, in low order field 335 with the contents of the second one of registers 323 including the second portion of immediate data, IMH, in high order field 334, thereby reconstructing long immediate data 337 comprising both the first and the second portions of immediate data.

Figure 4A:
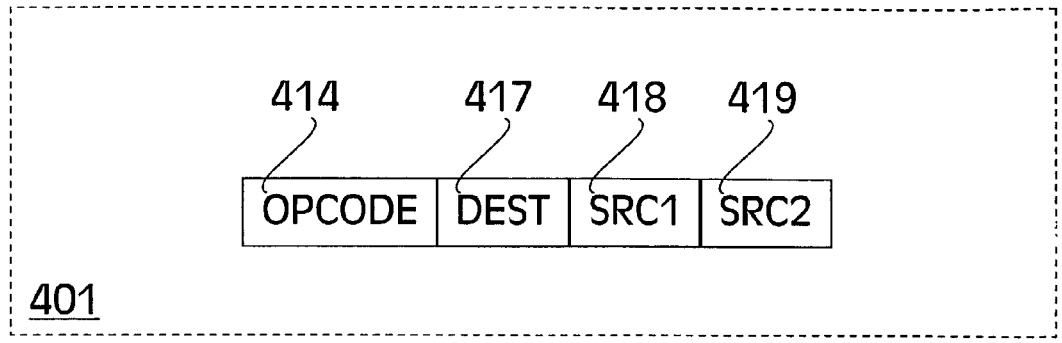
FIG. 4a illustrates an example of an instruction format for execution of instructions on a processor.

FIG. 4a illustrates an example of an instruction format 401 for execution of instructions on a processor, for example, processor 101 or processor 201. Instruction format 401 includes OPCODE 414, and optionally includes a destination operand DEST 417, source operand SRC1 418 and source operand SRC2 419. Instruction format 401 may be of fixed length or of variable length. Optional destination operand DEST 417 and source operands SRC1 418 and SRC2 419 may directly or indirectly indicate register locations or memory locations or may optionally include immediate data operands.

Figure 4B:
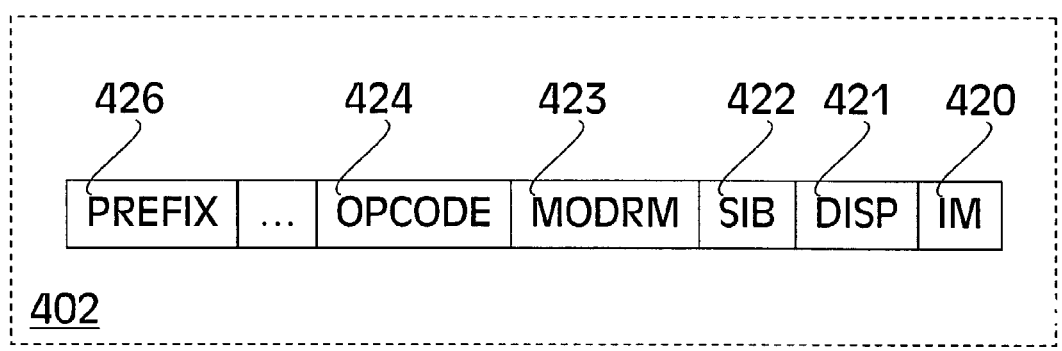
FIG. 4b illustrates an alternative example of an instruction format for execution of instructions on a processor.

FIG. 4b illustrates another example of an instruction format 402 for execution of instructions on a processor. This format corresponds with the general Intel® integer opcode format described in the "IA-32 Intel Architecture Software Developer's Manual, Volume 2: Instruction Set Reference," available from Intel Corporation, by calling 1-800-548-4725 or by visiting Intel's literature center at http://www.intel.com. Instruction format 402 includes OPCODE 424, which may comprise one or more bytes. Instruction format 402 optionally includes prefixes such as PREFIX 426, a MODRM 423 byte, an SIB 422 byte, one or more DISP 421 bytes and one or more IM 420 bytes. In one embodiment a source register address or destination register address may be provided in OPCODE 424. In another embodiment, a MODRM 423 byte includes a source register address at bits three through five, which also corresponds to a destination register address. In an alternate embodiment, bits three through five of the MODRM 423 byte corresponds to an opcode extension. In another alternate embodiment, a MODRM 423 byte includes a source register address at bits zero through two, which also corresponds to a destination register address.

In one embodiment, instruction format 402 provides for a memory source address or a memory destination address to be calculated according to an addressing mode provided by instruction format 402. This general format allows register to register, memory to register, register by memory, register by register, register by immediate, and register to memory addressing. In one embodiment, instruction format 402 provides for a programmer to include an immediate value in the one or more IM 420 bytes. These features of instruction format 402 are described in more detail in the "IA-32 Intel Architecture Software Developer's Manual, Volume 2: Instruction Set Reference," in Chapter 2 and Appendix B.

In one embodiment, instruction format 402 provides for an OPCODE 424 associated with a memory address of a default size and/or an operand of a default size. For example, a mode of operation may be provided for a processor, which has by default a 32-bit operand size and a 64-bit memory address size. Alternatively, default 64-bit operand sizes and memory address sizes may be used. For one embodiment of such a processor, the 64-bit memory addresses that are supported must be in a canonical form. It will be appreciated that other modes of operation having various default sizes may also be provided or that a particular OPCODE 424, PREFIX 426, or MODRM 423 encoding may be used to modify or override the default sizes, and that such modifications may be made without departing from the spirit of the invention as claimed.

Figure 4C:
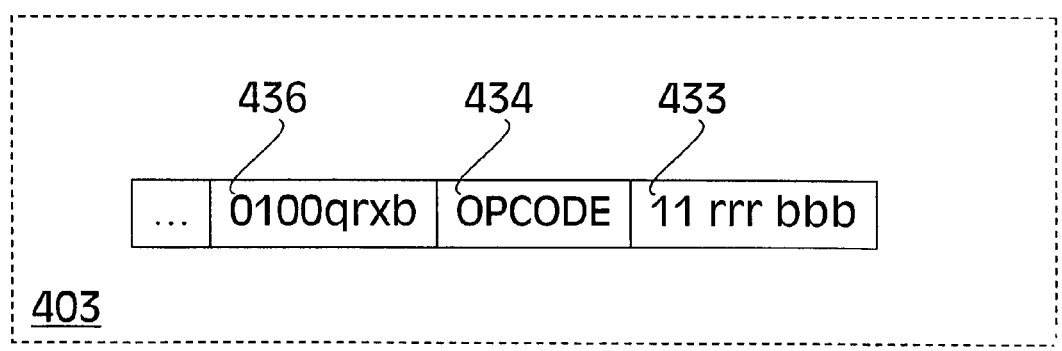
FIG. 4c illustrates an example of an instruction format permitting an optional extension prefix.

FIG. 4c illustrates, for example, an instruction format 403 permitting an optional extension PREFIX 436 for OPCODE 434. The optional extension PREFIX 436 may be used to modify a default operand size to 64-bits by setting q equal to 1, for example, or to modify either or both register addresses (specified by bits three through five and bits zero through two) in a MODRM 433 byte (by respectively setting r equal to 1 or h equal to 1 in the optional extension PREFIX 436).

Figure 4D:
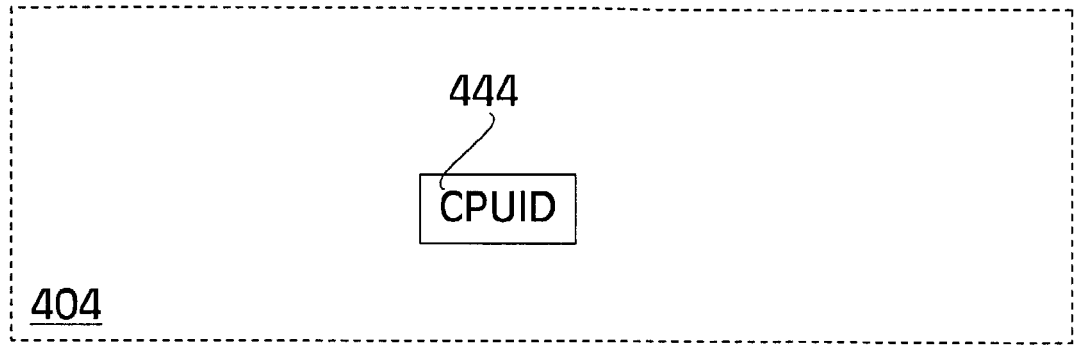
FIG. 4d illustrates an example of an instruction format for execution of a CPUID instruction on a processor.

FIG. 4d illustrates an example of an instruction format 404 for execution of an OPCODE 444 of a CPUID instruction on a processor. In one embodiment a CPUID instruction receives arguments implicitly from a register. For example, if a hexadecimal value of 8000 0001 is stored in register EAX, and the CPUID instruction is executed, an extended processor signature and extended feature bits may be returned. Alternatively, if the hexadecimal values of 8000 0002 and 8000 0003 are stored in register EAX, and the CPUID instruction is executed twice, once with each value, an ASCII string representing the processor brand name may be returned. One or more of the extended feature bits returned by the CPUID instruction may be set to indicate that the processor supports a particular extended feature, for example, support for 64-bit addresses or data may be indicated by an extended feature bit 29 being set to a value of 1.

Figure 4E:
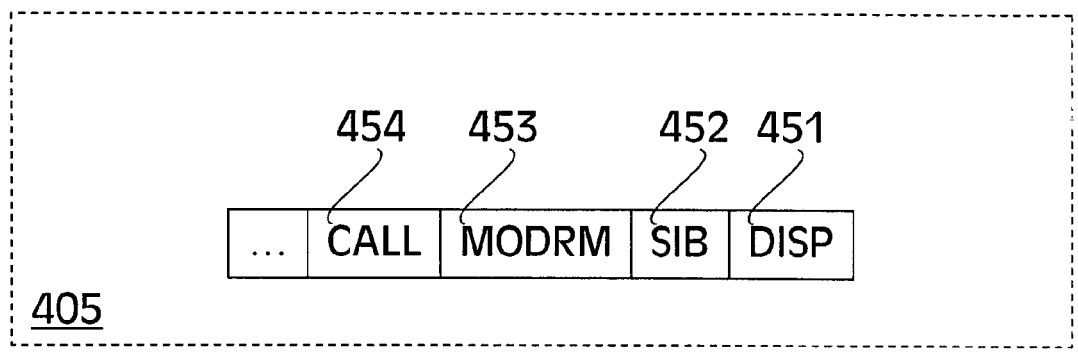
FIG. 4e illustrates an example of an instruction format for execution of a CALL instruction on a processor.

FIG. 4e illustrates an example of an instruction format 405 for execution of an OPCODE 454 of a CALL instruction on a processor. Instruction format 405 optionally includes prefixes, MODRM 453 byte, SIB 452 byte and one or more DISP 451 bytes. Instruction format 405 may be used, for example, to execute an OPCODE 454 of an intrasegment near CALL to a procedure within a current code segment, or to execute an OPCODE 454 of an intersegment far CALL to a procedure in a different code segment, or to execute an OPCODE 454 of an inter-privilege-level far CALL to a procedure in a segment at a different privilege level than the executing procedure or program, or alternatively to execute an OPCODE 454 of a CALL to a procedure in a different task. The MODRM 453 byte may optionally be used to provide a 3-bit extension to OPCODE 454. An address for the called procedure may be indicated directly or indirectly by a selected combination of OPCODE 454, MODRM 453 byte, SIB 452 byte and one or more DISP 451 bytes. For example, an OPCODE 454 having a hexadecimal value of E8 may indicate a direct near CALL using a DISP 451 relative to the next instruction; an OPCODE 454 having a hexadecimal value of FF may indicate an indirect CALL using a near or far address given in a register or memory location indicated by the MODRM 453 byte, and the optional SIB 452 byte and one or more DISP 451 bytes, and an OPCODE 454 having a hexadecimal value of 9A may indicate a direct far CALL using an absolute address indicated by the MODRM 453 byte, and the optional SIB 452 byte and one or more DISP 451 bytes.

Figure 4F:
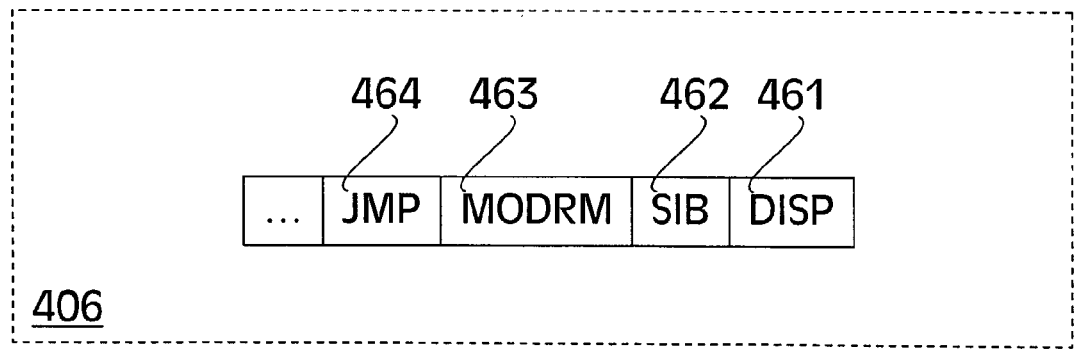
FIG. 4f illustrates an example of an instruction format for execution of a JMP instruction on a processor.

FIG. 4f illustrates an example of an instruction format 406 for execution of an OPCODE 464 of a JMP instruction on a processor. Instruction format 406 optionally includes prefixes, MODRM 463 byte, SIB 462 byte and one or more DISP 461 bytes. Instruction format 406 may be used, for example, to execute an OPCODE 464 of an intrasegment short or near JMP to an instruction within a current code segment, or to execute an OPCODE 464 of an intersegment far JMP to an instruction in a different code segment, or to execute an OPCODE 464 of a JMP to a different task. The MODRM 463 byte may optionally be used to provide a 3-bit extension to OPCODE 464. A target address may be indicated directly or indirectly by a selected combination of OPCODE 464, MODRM 463 byte, SIB 462 byte and one or more DISP 461 bytes. For example, a 1-byte OPCODE 464 having a hexadecimal value of EB or E9 may indicate a direct near JMP using a DISP 461 relative to the next instruction; an OPCODE 464 having a hexadecimal value of FF may indicate an indirect NIP using a near or far address given in a register or memory location indicated by the MODRM 463 byte, and the optional SIB 462 byte and one or more DISP 461 bytes, and an OPCODE 464 having a hexadecimal value of EA may indicate a direct far JMP using an absolute address indicated by the MODRM 463 byte, and the optional SIB 462 byte and one or more DISP 461 bytes. Alternatively, a 2-byte OPCODE 464 beginning with a hexadecimal value of 0F8 may indicate a direct near conditional JMP using a DISP 461 relative to the next instruction.

For one embodiment of a processor and a particular mode of operation, instructions such as CALL and JMP may indicate, by default, 64-bit memory addresses. For an alternative embodiment, only CALL or JMP instructions having particular opcodes or being of a particular type, for example, near CALL instructions and near or short JMP instructions, indicate a 64-bit address by default. For one embodiment a DISP 451 or DISP 461 may include a 64-bit long immediate offset. It will be appreciated that other instructions may similarly be included for control of execution flow in a processor which combines micro-operations to process long immediate data, for example, RETURN, LOOP, POP, PUSH, ENTER, or LEAVE.

Figure 4G:
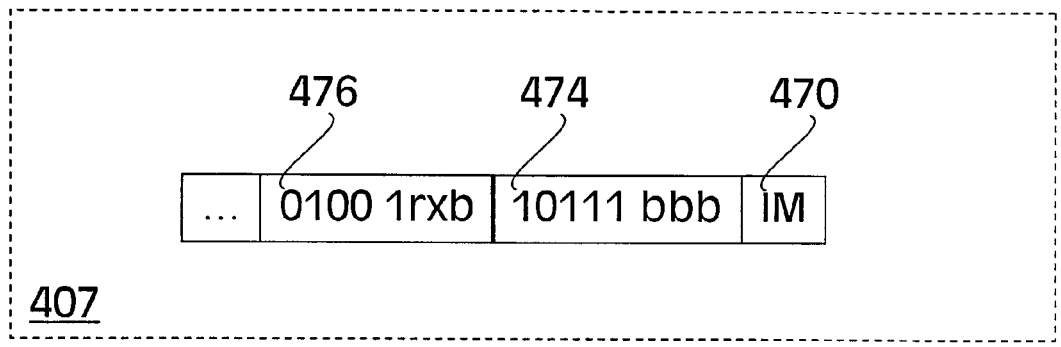
FIG. 4g illustrates an example of an instruction format for execution of an instruction on a processor to move immediate data.

FIG. 4g illustrates an example of an instruction format 407 for execution on a processor of an OPCODE 474 of a MOV instruction to move immediate data. Instruction format 407 optionally includes prefixes such as PREFIX 476, and one or more IM 470 bytes. Instruction format 407 may be used, for example, to execute an OPCODE 474 of a MOV instruction to move an immediate data of 8-, 16-, 32- or 64-bits to a register or to memory. For example, a 1-byte OPCODE 474 beginning with a binary value of 10111 (hexadecimal values B8-BF) may indicate a MOV instruction to load a 16-bit or 32-bit immediate data into a destination register addressed by bits zero through two of OPCODE 474.

A MODRM byte may optionally be used with OPCODE 474 to provide a 3-bit opcode extension and/or a destination register address or memory address optionally including an SIB byte and one or more DISP bytes. For example, an OPCODE 474 beginning with a binary value of 1100 011 (hexadecimal values C6-C7) may indicate a MOV instruction to load a 16-bit or 32-bit immediate data into a destination register or memory location indicated by a MODRM byte and one or more optional SIB and DISP bytes.

Alternatively, an optional PREFIX 476 beginning with a binary value of 01001 (hexadecimal values 48-4F) may be used to indicate that a 64-bit long immediate data and a 64-bit destination will be used for the MOV instruction.

Figure 4H:
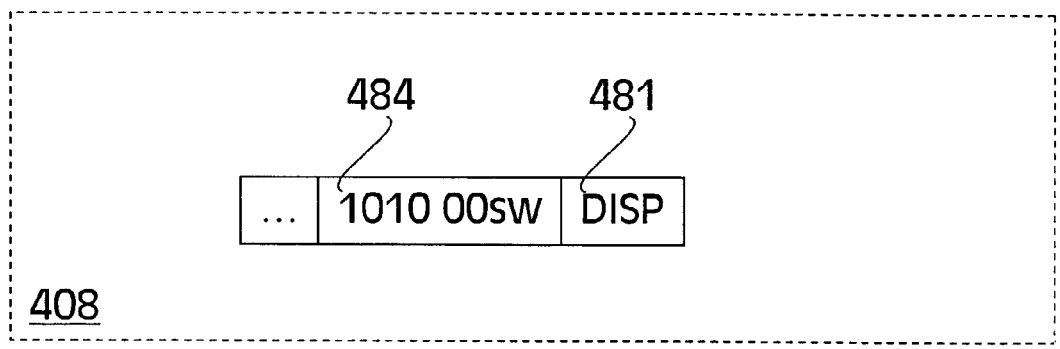
FIG. 4h illustrates an example of an instruction format for execution of an instruction on a processor to move data to or from an addressable storage location.

FIG. 4h illustrates an alternative example of an instruction format 408 for execution on a processor of an OPCODE 484 of a MOV instruction to move data to or from an addressable storage location. Instruction format 408 includes an OPCODE 484 byte beginning with, for example, a binary value of 101000 (hexadecimal values A0-A3) to indicate the type of MOV instruction; and also includes one or more DISP 481 bytes to specify a memory offset relative to a base address, for example, a segment base address. Bit one of the OPCODE 484 byte may be set to indicate that the MOV instruction is to store data from a register to the memory location addressed by DISP 481, or may be cleared to indicate that the MOV instruction is to load data to a register from the memory location addressed by DISP 481. Bit zero of the OPCODE 484 byte may be set to indicate that the MOV instruction will use a default word size for the data, or may be cleared to indicate a 1-byte data size. Alternatively, an optional prefix may be included in instruction format 408 to modify or override the default word size. The memory offset specified by DISP 481 may also be of a default size according to a particular mode of operation of the processor.

Figure 5:
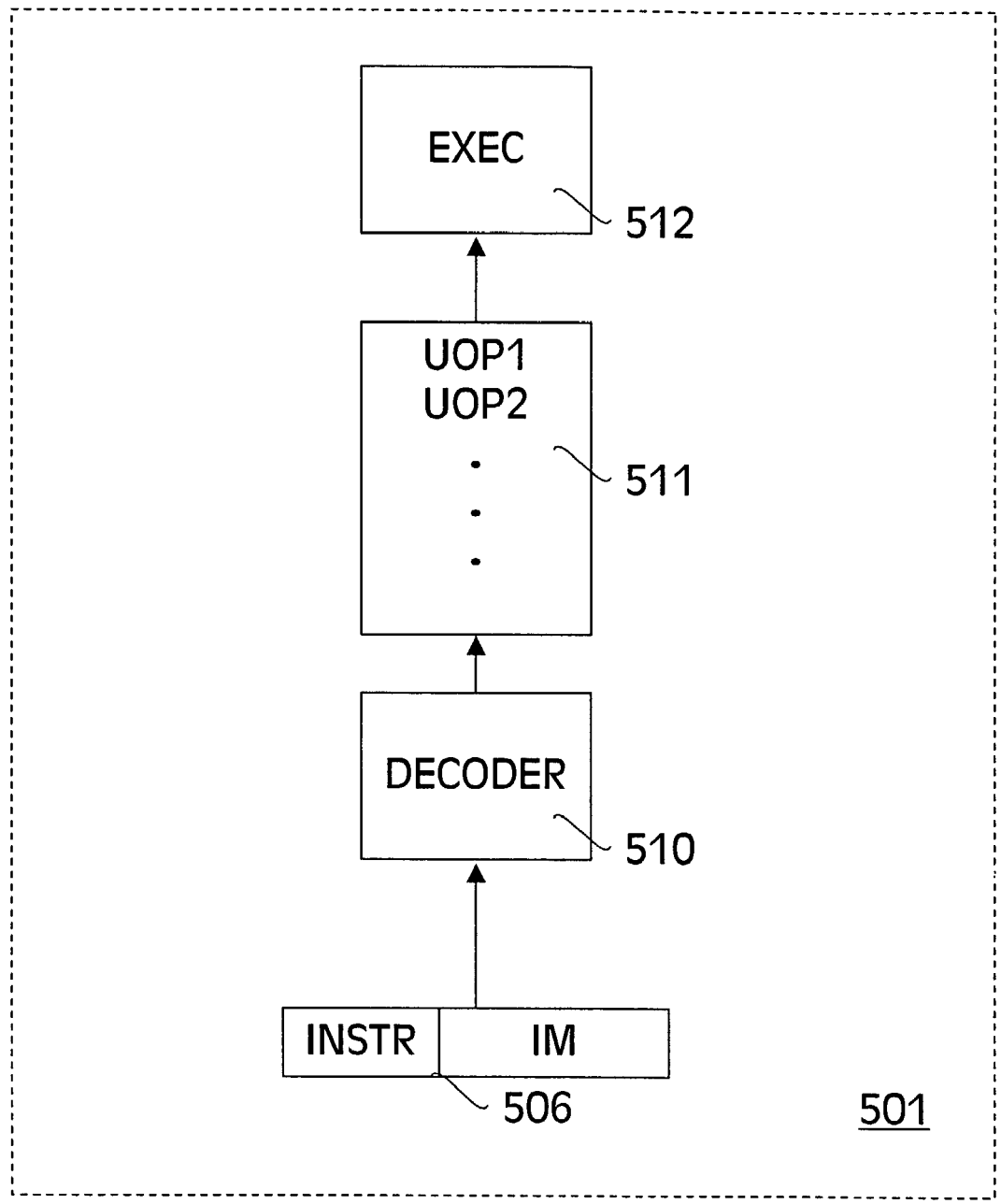
FIG. 5 illustrates one embodiment of an apparatus to decodes an instruction into a sequence of micro-operations and execute the micro-operations to reconstruct a long immediate data.

FIG. 5 illustrates one embodiment of an apparatus 501 to decodes an instruction 506 into a sequence of micro-operations and execute the micro-operations to reconstruct an immediate data. Apparatus 501 includes micro-operation storage 511 and decoder 510 to receive instruction 506 and to decode instruction 506 having an immediate data, decoder 510 producing a sequence of micro-operations including UOP1 and UOP2 to reconstruct the immediate data, micro-operations of the sequence to be stored in micro-operation storage 511. Apparatus 501 further includes execution logic 512 to receive the sequence of micro-operations, including UOP1 and UOP2, from micro-operation storage 511 and to execute the sequence of micro-operations received to execute instruction 506, reconstructing the immediate data of instruction 506 in the process responsive to UOP1 and UOP2.

For one embodiment micro-operation storage 511 provides for storage of micro-operations in a format that permits half of the immediate data of instruction 506 to be stored together with a single micro-operation but the invention is not so limited. For an alternative embodiment micro-operation storage 511 provides for storage of micro-operations in a format that permits less than half of the immediate data of instruction 506 to be stored together with a single micro-operation, but also permits sharing of immediate data storage between micro-operations.

Figure 6A:
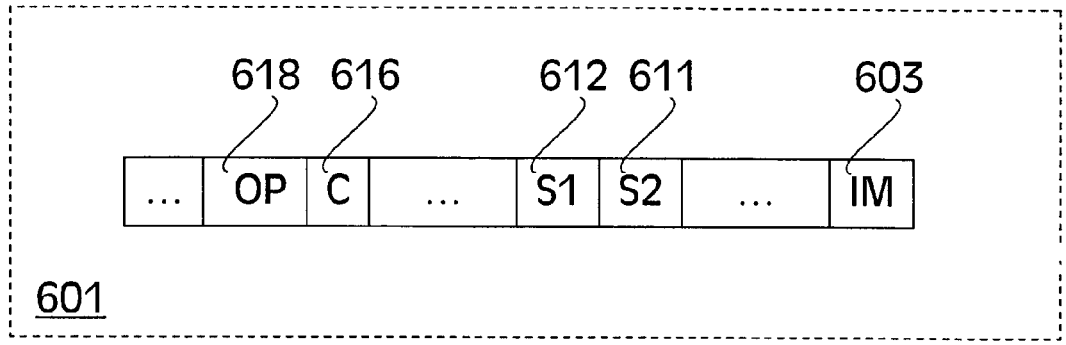
FIG. 6a illustrates one example of a format for storing a micro-operation.

FIG. 6a illustrates one example of a format 601 for storing a micro-operation. Format 601 comprises an OP 618 field to specify the micro-operation, a C 616 field to specify various control information for the micro-operation, an S1 612 field to specify a first source, an S2 611 field to specify a second source and an IM 603 field to hold immediate data. It will be appreciated that fields of a micro-operation may be continuous and uninterrupted or discontinuous and interrupted. The micro-operation storage format may also be continuous having all fields stored together in a common storage structure or discontinuous with various associated storage structures to store fields of the corresponding micro-operations. For one embodiment format 601 is similar to one described in application Ser. No. 09/223,299, titled "System and Method for Storing Immediate Data," filed Dec. 30, 1998, and assigned to Intel Corporation of Santa Clara, Calif.; now U.S. Pat. No. 6,338,132; wherein storage of immediate data may be shared with or scavenged from adjacent micro-operations in accordance with the control information specified in the C 616 field. For example, the control information may be specified in the C 616 field having a value of zero to indicate that the immediate data for the current micro-operation should be sign extended, one to indicate that a back scavenging technique is being used to store a portion of the immediate data for the current micro-operation with the previous micro-operation, two to indicate that a forward scavenging technique is being used to store a portion of the immediate data for the current micro-operation with the next micro-operation, and three to indicate that the current micro-operation shares the same immediate data stored with the previous micro-operation. For one embodiment of format 601, the IM 603 field comprises 16 bits but the invention is not so limited. For an alternative embodiment, the IM 603 field comprises 17 bits or more. It will also be appreciated that additional fields may be conveniently included in format 601.

Figure 6B:
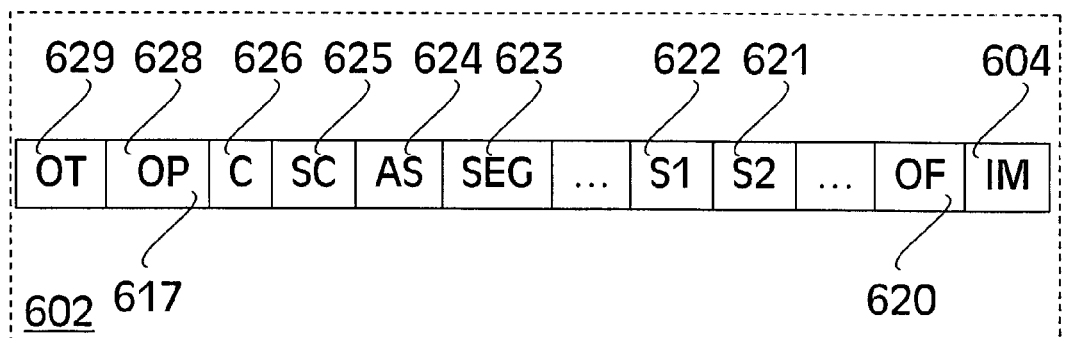
FIG. 6b illustrates another example of a format for storing a micro-operation.

FIG. 6b illustrates another, more detailed, example of a format 602 for storing a micro-operation. Format 602 comprises an OT 629 field to specify an operand type, an OP 628 field to specify the micro-operation (the OP 628 field having a least significant bit 617), a C 626 field to specify control information for the micro-operation, an SC 625 field to specify a scalar factor, an AS 624 field to specify an address size, an SEG 623 field to specify a segment, an S1 622 field to specify a first source, an S2 621 field to specify a second source, an OF 620 field to specify an overflow, and an IM 604 field to hold immediate data. For one embodiment of format 602, some fields may be used for an alternative purpose responsive to a particular micro-operation.

Figure 7A:
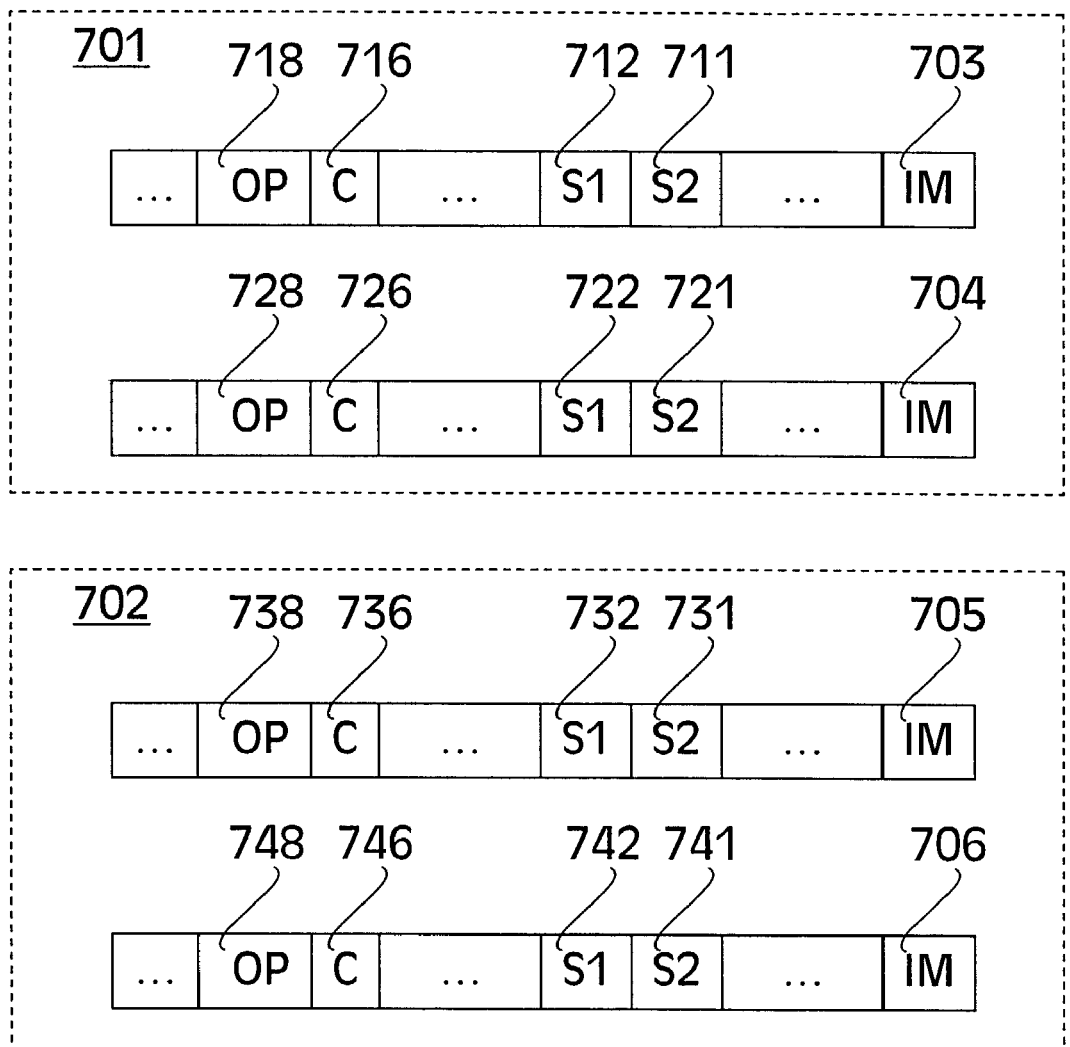
FIG. 7a illustrates one embodiment of immediate data stored according to a format for storing a micro-operation to process immediate data.

FIG. 7a illustrates one embodiment of immediate data stored according to format 601 for storing a micro-operation to process immediate data. A set of micro-operations 701 includes a first micro-operation specified in the OP 718 field optionally for sources specified in the S1 712 field and in the S2 711 field, or alternatively in the OP 728 field optionally for sources specified in the S1 722 field and e S2 721 field, and may be associated with a first portion of immediate data held in fields IM 703 and IM 704 in accordance with the control information specified in fields C 716 and C 726. A set of micro-operations 702 includes a second micro-operation specified in the OP 738 field optionally for sources specified in the S1 732 field and in the S2 731 field or alternatively in the OP 748 field optionally for sources specified in the S1 742 field and the S2 741 field, and may be associated with a second portion of immediate data held in fields IM 705 and IM 706 in accordance with the control information specified in fields C 736 and C 746.

The first and second micro-operations may be combined as disclosed above to reconstruct a long immediate data. For example, the first and second micro-operations may be used in accordance with an apparatus 301, wherein a micro-operation storage provides the set of micro-operations 701, which includes the first micro-operation, to execution logic. Responsive to the first micro-operation, the execution logic may store the first portion of immediate data, held in fields IM 703 and IM 704, into a high order field of a register. The micro-operation storage further provides the set of micro-operations 702, which includes the second micro-operation, to the execution logic. Responsive to the second micro-operation, the execution logic may provide the second portion of immediate data, held in fields IM 705 and IM 706, as an input to a logic unit 316 and initiate an operation to combine the contents of the register, which includes the first portion of immediate data in the high order field, with the second portion of immediate data, thereby reconstructing a long immediate data that comprises both the first and the second portions of immediate data. For one embodiment a 64-bit long immediate data is reconstructed from fields IM 703, IM 704, IM 705 and IM 706 each holding 16 bits of immediate data but the invention is not so limited. For an alternative embodiment fields IM 703, IM 704, IM 705 and IM 706 may each hold up to 17 or more bits of immediate. For another alternative embodiment one of the fields IM 703 or IM 704 may hold up to 32 or more bits of immediate data, while IM 705 and IM 706 may each hold up to 16 bits of immediate.

Figure 7B:
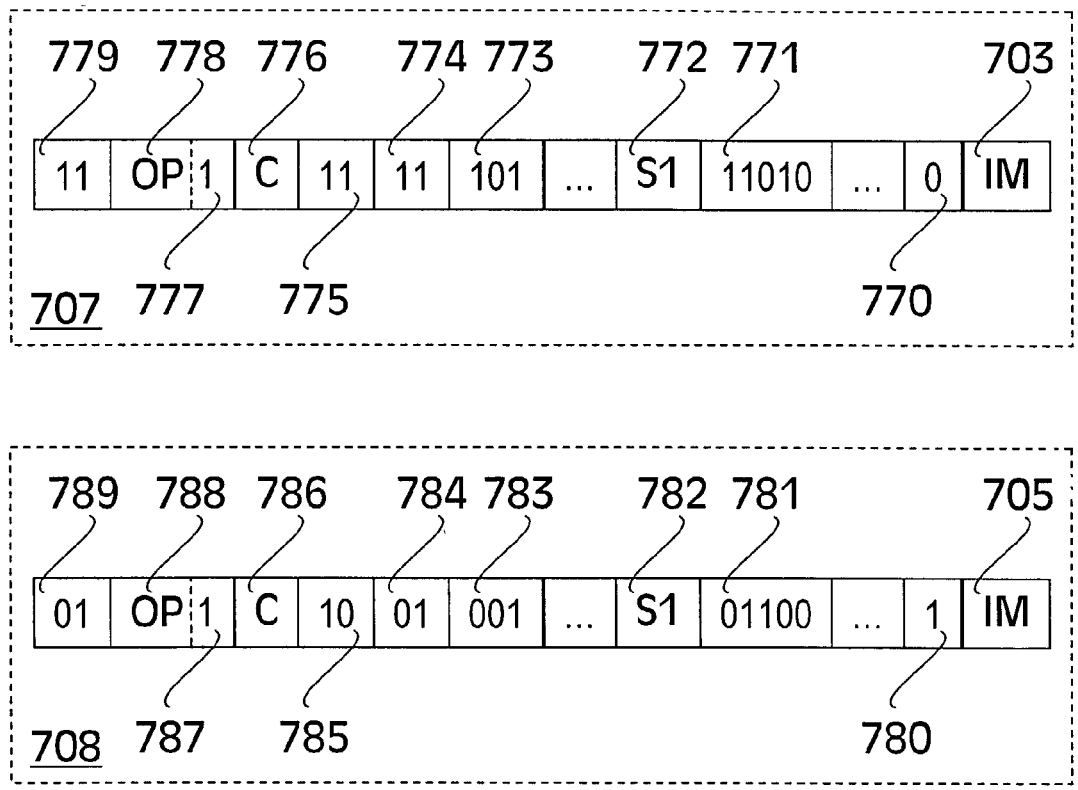
FIG. 7b illustrates an alternative embodiment of immediate data stored according to a format for storing a micro-operation to process immediate data.

FIG. 7b illustrates an alternative embodiment of immediate data stored according to a format 602 for storing a micro-operation to process immediate data. A set of micro-operations 707 includes a C 776 field, an S1 772 field, a first micro-operation specified in an upper portion of an OP 778 field and may be associated with a first portion of immediate data held in a OT 779 field, a least significant bit 777 of the OP 778 field, an SC 775 field, an AS 774 field, an SEG 773 field, an S2 771 field, an OF 770 field and the IM 703 field. A set of micro-operations 708 includes a C 786 field, an S1 782 field, a second micro-operation specified in an upper portion of an OP 788 field and may be associated with a first portion of immediate data held in an OT 789 field, a least significant bit 787 of the OP 788 field, an SC 785 field, an AS 784 field, an SEG 783 field, an S2 781 field, an OF 780 field and the IM 705 field.

For one embodiment, up to 34 bits of immediate data may be associated with each of the first and second micro-operations respectively: bits 33-31 being held in fields OT 779 and OT 789, bit 30 being held in the least significant bit 777 of the OP 778 field and the least significant bit 787 of the OP 788 field, bits 29-28 being held in fields SC 775 and SC 785, bits 27-26 being held in fields AS 774 and AS 784, bits 25-23 being held in fields SEG 773 and SEG 783, bits 22-18 being held in fields S2 771 and S2 781 field, bit 17 being held in fields OF 770 and OF 780, and bits 16-0 being held in fields IM 703 and IM 705; but the invention is not so limited. For one embodiment a 64-bit long immediate data is reconstructed. For an alternative embodiment a long immediate data having up to 68 or more bits is reconstructed.

It will be appreciated that the first and second micro-operations may be combined in various ways to reconstruct a long immediate data—for example, in accordance with an apparatus 301, wherein a micro-operation storage provides the set of micro-operations 707, which includes the first micro-operation, and the set of micro-operations 708, which includes the second micro-operation, to execution logic. Responsive to the first micro-operation, the execution logic may store the first portion of immediate data into a high order field of a register. Responsive to the second micro-operation, the execution logic may provide the second portion of immediate data as an input to a logic unit 316 and initiate an operation to combine the contents of the register, which includes the first portion of immediate data in the high order field, with the second portion of immediate data, thereby reconstructing a long immediate data.

Alternatively, a micro-operation storage provides the set of micro-operations 707, which includes the first micro-operation, and the set of micro-operations 702, which includes the second micro-operation, to execution logic. Responsive to the first and second micro-operations, the execution logic may store the first portion of immediate data into a high order field of a register and provide the second portion of immediate data as an input to a logic unit 316 to combine the contents of the register with the second portion of immediate data, thereby reconstructing a long immediate data.

It will be appreciated that a first micro-operation, either of the set of micro-operations 701 or of the set of micro-operations 707, may be combined with a second micro-operation, either of the set of micro-operations 702 or of the set of micro-operations 708, in accordance with an apparatus (apparatus 301, 302 or 303 for example) and the methods herein disclosed to reconstruct a long immediate data for an instruction. One embodiment of a decoder decoding a MOV instruction, for example, to move a long immediate data into a register may produce a first micro-operation of the set of micro-operations 707 and a second micro-operation of the set of micro-operations 708, while an alternative embodiment of a decoder decoding a MOV instruction to move data to or from a memory location addressed by a long immediate offset data may produce a first micro-operation of the set of micro-operations 707 and a second micro-operation of the set of micro-operations 702.

Figure 8:
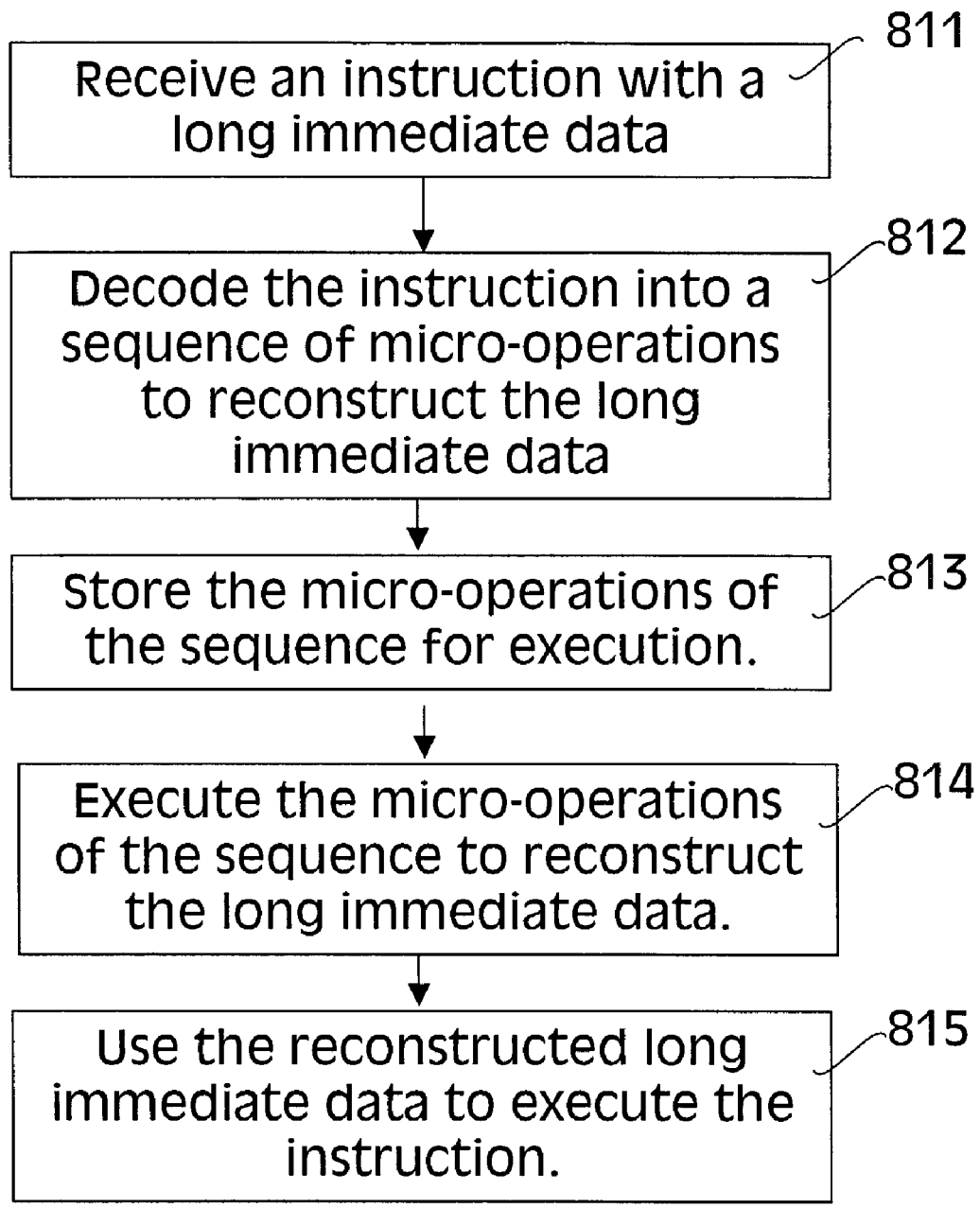
FIG. 8 illustrates a flow diagram for one embodiment of a process to decode an instruction into micro-operations and execute the micro-operations to process immediate data.

FIG. 8 illustrates a flow diagram for one embodiment of a process to decode an instruction into micro-operations and execute the micro-operations to process immediate data. The process illustrated and other processes herein disclosed are performed by processing blocks that may comprise dedicated hardware or software or firmware operation codes executable by general purpose machines or by special purpose machines or by a combination of both. In processing block 811 an instruction with a long immediate data is received. Processing continues in processing block 812, where the instruction is decoded into a sequence of micro-operations to reconstruct the long immediate data; and in processing block 813, the micro-operations of the sequence are stored for execution. In processing block 814, the micro-operations of the sequence are executed to reconstruct the long immediate data. Finally, in processing block 815, the reconstructed long immediate data is used to execute the instruction.

Figure 9A:
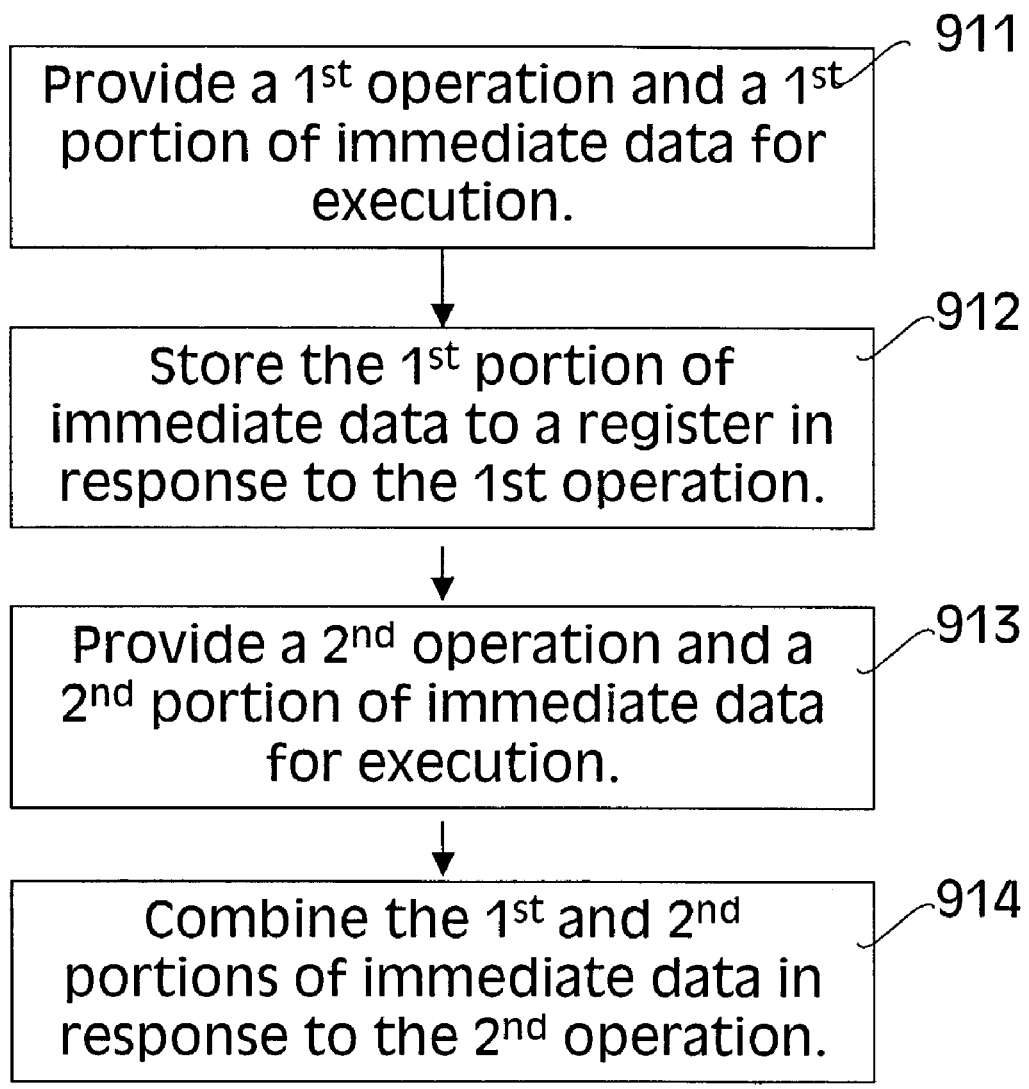
FIG. 9a illustrates a flow diagram for one embodiment of a process to combine micro-operations to process immediate data.

FIG. 9*a* illustrates a flow diagram for one embodiment of a process to combine micro-operations to process immediate data. In processing block 911, a first operation and a first portion of immediate data are provided for execution. Processing continues in processing block 912, where the first portion of immediate data is stored to a register in response to the first operation. In processing block 913, a second micro-operation and a second portion of immediate data are provided for execution. Then in processing block 914, the first and second portions of immediate data are combined in response to the second operation.

Figure 9B:
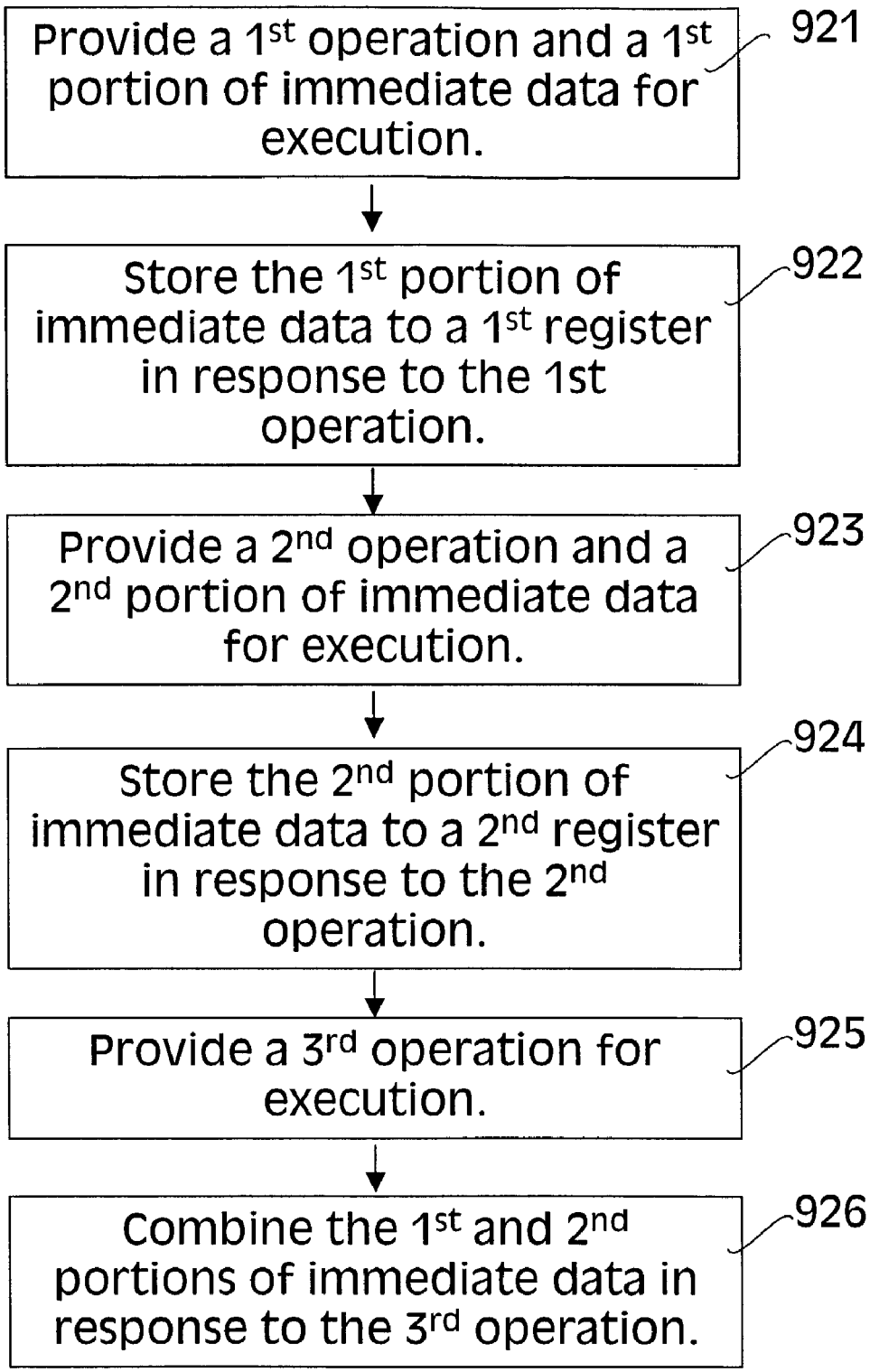
FIG. 9b illustrates a flow diagram for an alternative embodiment of a process to combine micro-operations to process immediate data.

FIG. 9*b* illustrates a flow diagram for an alternative embodiment of a process to combine micro-operations to process immediate data. In processing block 921, a first operation and a first portion of immediate data are provided for execution. Processing continues in processing block 922, where the first portion of immediate data is stored to a register in response to the first operation. In processing block 923, a second operation and a second portion of immediate data are provided for execution. Processing continues in processing block 924, where the second portion of immediate data is stored to a register in response to the second operation. In processing block 925, a third micro-operation is provided for execution. Finally, in processing block 926, the first and second portions of immediate data are combined in response to the third operation.

It will be appreciated that additional operations may also be provided to use the combined portions of immediate data to perform functions of a decoded instruction, or alternatively that these functions may be also performed by one or more of the operations provided in the processes of FIG. 9*a* or FIG. 9*b*.

It will also be appreciated that the processing blocks of the processes disclosed herein may be executed sequentially in the order illustrated, or out of sequential order, or concurrently, or according to some combination of these alternatives. It will be further appreciated that sequences of micro-operations may also be stored and/or executed in sequential order, or out of sequential order, or concurrently, or according to some combination of these alternatives, and that known techniques may be used to ensure correctness of the results.

The above description is intended to illustrate preferred embodiments of the present invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims and their equivalents.

What is claimed is:

1. An apparatus comprising:
a decoder to receive a first instruction of a first instruction format, the first instruction format including an opcode and a plurality of bytes of immediate data, the decoder to decode the first instruction to provide a first micro-operation to process a first portion of the plurality of bytes of immediate data and a second micro-operation to process a second portion of the plurality of bytes of immediate data;
a storage medium coupled with the decoder to receive and to store the first and second micro-operations for execution;
an execution unit having a first input coupled with the storage medium to receive the first and second micro-operations, and further having a first output coupled to a group of registers and a second output coupled to a logic unit, the execution unit responsive to the first micro-operation to store the first portion of the plurality of bytes of immediate data in a first portion of a first register of the group of registers, and responsive to the second micro-operation to provide the second portion of the plurality of bytes to the logic unit via the second output to initiate an operation in the logic unit to recombine the first and second portions of the plurality of bytes of immediate data; and
the logic unit separate from and coupled to the execution unit and having a first input coupled to the group of registers to receive the first portion of the plurality of bytes of immediate data from the first portion of the first register and having a second input coupled to the execution unit to receive the second portion of the plurality of bytes of immediate data directly from the execution unit and to recombine the first and second portions of the plurality of bytes of immediate data responsive to the initiation of the recombination by the execution unit.

2. The apparatus of claim 1 wherein the opcode of the first instruction indicates a MOV instruction.

3. The apparatus of claim 2 wherein the first instruction format also includes a prefix byte.

4. The apparatus of claim 3 wherein the plurality of bytes of immediate data are to be moved to a register in accordance with the operation indicated by the opcode of the first instruction.

5. The apparatus of claim 4 wherein the opcode of the first instruction has a hexadecimal value in a range of B8 through BF.

6. The apparatus of claim 2 wherein the plurality of bytes of immediate data specify a memory offset relative to a base address.

7. The apparatus of claim 6 wherein data is to be moved between a register and a memory location addressed by the memory offset specified by the plurality of bytes of immediate data in accordance with the operation indicated by the opcode of the first instruction.

8. The apparatus of claim 7 wherein the opcode of the first instruction has a hexadecimal value in a range of A0 through A3.

9. The apparatus of claim 1 wherein responsive to a third micro-operation, the execution unit is to store the second portion of the plurality of bytes of immediate data in a second portion of a second register of the group of registers, the third micro-operation to be executed prior to the second micro-operation.

10. The apparatus of claim 1 wherein the logic unit is to perform an addition operation to recombine the first and second portions of the plurality of bytes of immediate data.

11. The apparatus of claim 1 wherein the logic unit is to perform a concatenation operation to recombine the first and second portions of the plurality of bytes of immediate data.

12. The apparatus of claim 1 wherein the logic unit is to perform a logic OR operation to recombine the first and second portions of the plurality of bytes of immediate data.

13. A processor comprising:
an instruction decoder, responsive to decoding an instruction with an immediate data, to provide a plurality of micro-operations including first and second micro-operations having corresponding portions of the immediate data;
a micro-operation storage to store the plurality of micro-operations and the corresponding portions of the immediate data provided by the instruction decoder;
execution logic having a first input coupled to the instruction decoder to receive the first and second micro-operations and further having a first output coupled to a group of registers and a second output coupled to a logic unit, wherein the first micro-operation is to cause the execution logic to store the portion of the immediate data corresponding to the first micro-operation in a first portion of a first register of the group of registers via the first output, and the second micro-operation is to cause the execution logic to provide via the second output the portion of the immediate data corresponding to the second micro-operation to a first input of the logic unit and to initiate an operation in the logic unit to combine the portions of the immediate data;
the logic unit separate from the execution logic and coupled to the group of registers via a second input to receive an output of the first register from the register and coupled to the execution logic via the first input to receive the portion of the immediate data corresponding to the second micro-operation directly from the execution logic and to combine the first register output and the portion of the immediate data responsive to the initiation of the combination by the execution logic; and
an address generator to generate an address from the recombined immediate data responsive to one of the plurality of micro-operations.

14. The processor of claim 13 wherein an opcode byte of the instruction has a hexadecimal value in a range of A0 through A3.

15. A processor comprising:
a decoder to receive a first instruction of a first instruction format, the first instruction format including an opcode and immediate data, the decoder to decode the first instruction to provide a first micro-operation to process a first portion of the immediate data, a second micro-operation to process a second portion of the immediate data, and a third micro-operation to recombine the first and second portions of the immediate data;
a storage medium coupled with the decoder to receive and to store the first, second and third micro-operations for execution;
an execution unit having a first input coupled with the storage medium to receive the first, second and third micro-operations, and further having a first output coupled to a group of registers and a second output coupled to a logic unit, the execution unit responsive to the first micro-operation to store the first portion of the immediate data in a first portion of a first register of the group of registers, responsive to the second micro-operation to store the second portion of the immediate data in a second portion of a second register of the group of registers and responsive to the third micro-operation to initiate an operation in the logic unit to recombine the first and second portions of the immediate data, and to thereafter perform an operation indicated by the opcode of the first instruction; and the logic unit separate from and having a first input coupled to the execution unit second input coupled to the group of registers to receive the first portion of the immediate data from the first portion of the first register, and a third input coupled to the group of registers to receive the second portion of the immediate data from the second portion of the second register and to recombine the first and second portions of the immediate data responsive to the initiation of the operation by the execution unit via the first input to the logic unit.

16. The processor of claim 15 wherein the logic unit is to recombine the first and second portions of the immediate data via a logical OR operation.

* * * * *

UNITED STATES PATENT AND TRADEMARK OFFICE
CERTIFICATE OF CORRECTION

| | | |
|---|---|---|
| PATENT NO. | : 7,941,651 B1 | Page 1 of 1 |
| APPLICATION NO. | : 10/185876 | |
| DATED | : May 10, 2011 | |
| INVENTOR(S) | : Bret L. Toll et al. | |

It is certified that error appears in the above-identified patent and that said Letters Patent is hereby corrected as shown below:

IN THE CLAIMS:

Column 15:
Line 6, Claim 15, "unit second" should be --unit, a second--.

Signed and Sealed this

Second Day of August, 2011

David J. Kappos
*Director of the United States Patent and Trademark Office*